(12) United States Patent
Aikawa et al.

(10) Patent No.: US 8,339,240 B2
(45) Date of Patent: Dec. 25, 2012

(54) SEMICONDUCTOR ELEMENT, BIOMETRIC AUTHENTICATION METHOD, BIOMETRIC AUTHENTICATION SYSTEM AND MOBILE TERMINAL

(75) Inventors: Makoto Aikawa, Sagamihara (JP); Shoko Hatanaka, Tokyo (JP); Takeshi Inoue, Kawasaki (JP); Hiroki Yamazaki, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 624 days.

(21) Appl. No.: 12/503,998

(22) Filed: Jul. 16, 2009

(65) Prior Publication Data

US 2010/0085150 A1  Apr. 8, 2010

(30) Foreign Application Priority Data

Oct. 8, 2008 (JP) .................... 2008-261212

(51) Int. Cl.
*G06K 9/00* (2006.01)

(52) U.S. Cl. .......... 340/5.82; 340/5.52; 340/5.53; 340/5.83; 340/5.84; 382/115; 382/118; 382/124; 713/186; 283/69

(58) Field of Classification Search .......... 340/5.52, 340/5.53, 5.82, 5.83, 5.84; 382/115, 118, 382/124; 713/186; 283/69
See application file for complete search history.

(56) References Cited

U.S. PATENT DOCUMENTS

| 2004/0124246 | A1* | 7/2004 | Allen et al. .................. 235/492 |
| 2004/0243356 | A1* | 12/2004 | Duffy et al. .................. 702/189 |
| 2005/0207624 | A1* | 9/2005 | Ehlers et al. .................. 382/124 |
| 2006/0080550 | A1 | 4/2006 | Awatsu et al. |
| 2006/0143117 | A1* | 6/2006 | Chigira et al. .................. 705/39 |
| 2006/0193500 | A1* | 8/2006 | Awatsu et al. ............... 382/115 |
| 2006/0210126 | A1* | 9/2006 | Cho .............................. 382/124 |
| 2008/0056544 | A1 | 3/2008 | Aikawa et al. |

FOREIGN PATENT DOCUMENTS

| CN | 101008987 | 8/2007 |
| CN | 101086791 | 12/2007 |
| JP | 2004-506253 | 2/2004 |
| WO | WO 01/84494 A1 | 11/2001 |

OTHER PUBLICATIONS

Chinese Office Action, dated Jan. 29, 2012, issued in corresponding Chinese Patent Application No. 200910151440.6.
European Search Report, dated Sep. 6, 2012, issued in corresponding European Patent Application No. 09251797.

* cited by examiner

*Primary Examiner* — Jennifer Mehmood
*Assistant Examiner* — Andrew Bee
(74) *Attorney, Agent, or Firm* — Antonelli, Terry, Stout & Kraus, LLP.

(57) ABSTRACT

A semiconductor element or mobile terminal stores a user's biometric information pattern used for execution of a biometric authentication process and the residual number of trials indicating the number of allowed failures in the biometric authentication process, sends processing data to an external device so that the external device can use the processing data when the external device executes part of the biometric authentication process, and decreases the residual number of trials by a predetermined value while the processing data is output to the external device after start of communication with the external device.

11 Claims, 10 Drawing Sheets

SEMICONDUCTOR ELEMENT, BIOMETRIC AUTHENTICATION METHOD, BIOMETRIC AUTHENTICATION SYSTEM AND MOBILE TERMINAL

This application claims the benefit of priority of Japanese Application No. 2008-261212 filed on Oct. 8, 2008, the disclosure of which also is entirely incorporated herein by reference.

TECHNICAL FIELD

The present invention relates to a technique for performing biometric authentication.

BACKGROUND

A method for storing a biometric template in a smart card to thereby limit information or access to a room or the like by use of the template has been disclosed in JP-T-2004-506253. Specifically, a biometric template, which is separated into a private part used only in a smart card for authentication and a public part fed to an external processor and used for authentication, is stored in the smart card so that the smart card restricted in terms of processing power can be used for biometric checking with security strengthened.

SUMMARY

Generally, authentication using biometric information has higher security than authentication using PIN (personal identification number) or the like. Someone is however likely to try illegal access by creating imitative fingerprints or veins. In such a case, there is a possibility that illegal access will be permitted because imitative fingerprints or veins can be changed little by little if the number of authentication trials is not limited. Limitation in the number of trials has been used for entering of PIN into ATM (automated teller machine). When authentication using biometric information is assigned to the inside of a card and an external device, there is a possibility that the external device itself may be a device aiming at acquiring data illegally. Therefore, how to limit the number of trials is required of the card even in the case where the external device fails in authentication. Such limitation in the number of authentication trials has not been at all described in JP-T-2004-506253.

An object of the invention is to provide a semiconductor element, a biometric authentication method, a biometric authentication system and a mobile terminal in which security can be improved.

A biometric authentication method according to the invention includes the steps of: storing a user's biometric information pattern used for execution of a biometric authentication process and the residual number of trials indicating the number of allowed failures in the biometric authentication process; sending processing data to an external device so that the external device can use the processing data when the external device executes part of the biometric authentication process; and decreasing the residual number of trials by a predetermined value while the processing data is output to the external device after start of communication with the external device.

DETAILED DESCRIPTION

Figure 1:
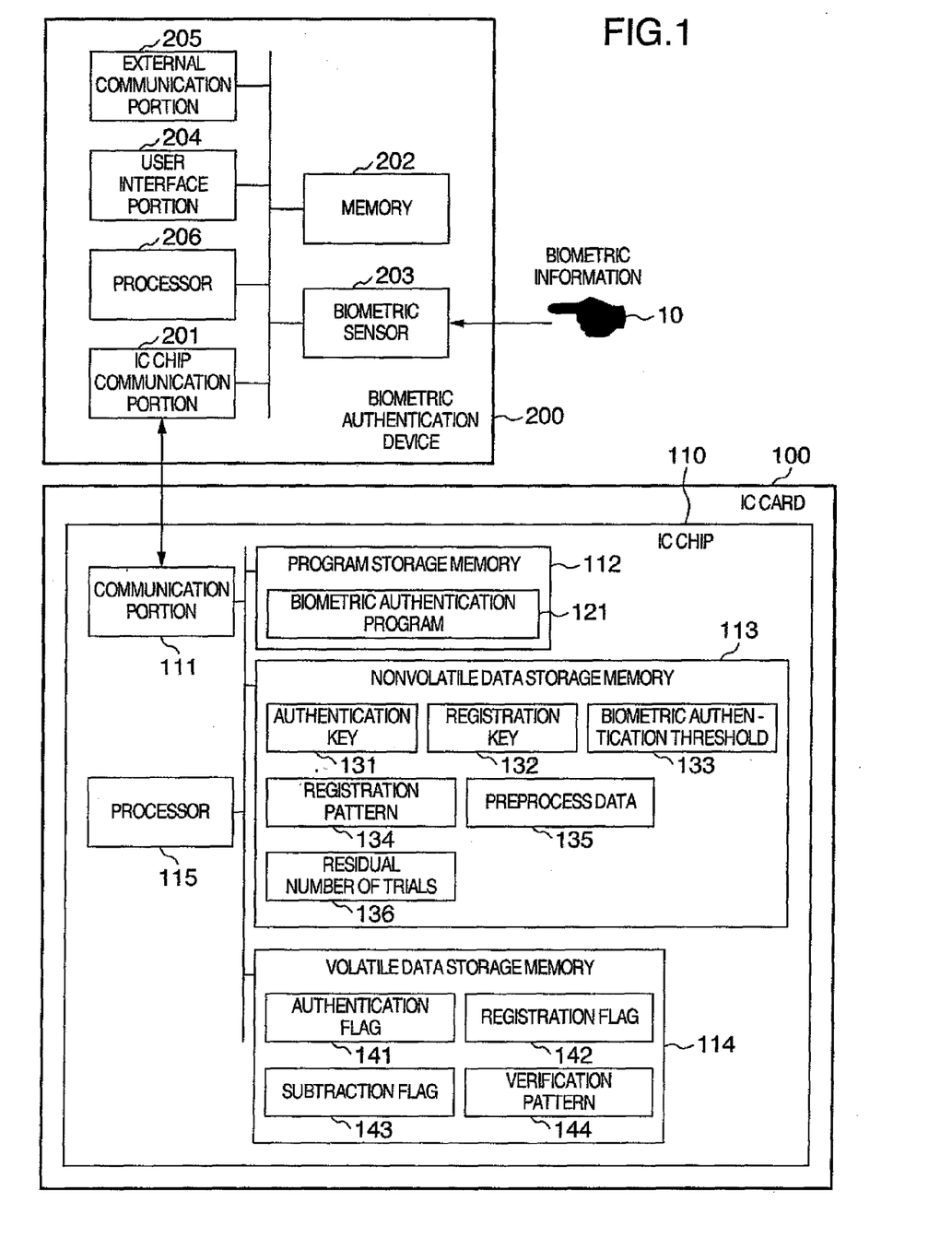
FIG. 1 is a configuration diagram showing an example of a biometric authentication system.

FIG. 1 is a configuration diagram showing an example of a biometric authentication system. An IC card 100 has a semiconductor element (hereinafter referred to as IC chip) 110 which stores biometric information data as data concerned with biometric information 10 such as a fingerprint pattern or a vein pattern of a user and which performs biometric authentication. Although this embodiment has been described in the case where the IC chip 110 is mounted in the IC card 100, the invention is not limited thereto. For example, the IC chip 110 may be mounted in a mobile terminal such as a cellular phone. A biometric authentication device 200 acquires biometric information 100 of a user and communicates with the IC chip 110 to thereby perform biometric authentication. Examples of the biometric authentication device 200 are an entrance/exit management machine, a counter service terminal for financial transaction, an automated teller machine (ATM), etc. However, the biometric authentication device 200 is not limited to these examples but may be applied to other devices such as a personal computer (PC). Incidentally, the biometric information data is not limited to the fingerprint pattern and the vein pattern. For example, the biometric information data may be data concerned with other biometric information such as a palm print pattern, a voiceprint pattern, etc.

The internal configuration of the IC chip 110 will be described next. A communication portion 111 communicates with the outside, for example, in accordance with contact communication defined in the international standard ISO/IEC 7816 or non-contact communication defined in the international standard ISO/IEC 14443. A program storage memory 112 has a function of permanently storing programs held in the IC chip 110. The program storage memory 112 is made of a nonvolatile semiconductor memory such as a read-only memory (ROM), an electrical erasable programmable read-only memory (EEPROM), etc. A nonvolatile data storage memory 113 is a data writable memory which can hold arbitrary data continuously even when power supply to the IC chip 110 is interrupted. The nonvolatile data storage memory 113 is made of a nonvolatile semiconductor memory such as an EEPROM, etc. A volatile data storage memory 114 is a data writable memory which can hold data temporarily. The volatile data storage memory 114 is made of a volatile semiconductor memory such as a random access memory (RAM), etc. Accordingly, when power supply to the IC chip 110 is interrupted, data written in the volatile data storage memory 114 is erased.

A processor 115 controls the whole of the IC chip 110. For example, when a control command is received via the communication portion 111, the processor 115 performs a process corresponding to the received control command based on a program stored in the program storage memory 112 and executes a process of sending a corresponding response to the outside via the communication portion 111.

The internal configuration of the biometric authentication device 200 will be described. An IC chip communication portion 201 communicates with the IC chip 110 or the like, for example, in accordance with contact communication defined in the international standard ISO/IEC 7816 or non-contact communication defined in the international standard ISO/IEC 14443. A memory 202 has a function of storing programs and data for controlling the biometric authentication device 200. The memory 202 is made of a hard disk, a semiconductor memory, etc. A biometric sensor 203 has a function of reading biometric information of a user. A user interface portion 204 has an output function for outputting visual/audio information such as images or characters to the user, and an input function for permitting the user to input necessary information. For example, the output function is made of a liquid crystal display, a speaker, etc. For example, the input function is made of a keyboard, a touch panel, etc. An external communication portion 205 has a function of communicating with another device or a host server by wire or wireless. For example, the external communication portion 205 connects the biometric authentication device 200 to an intranet communication network such as a local area network (LAN), a public line network such as a phone line or the Internet or a private line network. A processor 206 controls the whole of the biometric authentication device 200 and performs a biometric authentication process based on programs and data stored in the memory 202.

The configuration of programs and data held in the IC chip 110 will be described next.

The program storage memory 112 stores a biometric authentication program 121. The biometric authentication program 121 is an application program which is used for executing a biometric authentication process using the IC chip 110. Though not shown, application programs such as a financial transaction program for credit settlement etc. other than the biometric authentication program 121 may be stored in the program storage memory 112. It is also preferable that an IC chip operating system for selection of application programs to be executed and for management of application programs in execution is stored in the program storage memory 112. For example, it is conceived that MULTOS or Java (registered trademark) Card is used as the IC chip operating system. Nonvolatile data such as an authentication key 131, a registration key 132, a biometric authentication threshold 133, a registration pattern 134, preprocess data 135, data of the residual number of trials 136, etc. based on the biometric authentication program 121 are stored in the nonvolatile data storage memory 113. The authentication key 131 is key data for performing device authentication and cipher communication between the IC chip 110 and the biometric authentication device 200. The registration key 132 is key data used for performing a device authentication process necessary for registering the registration pattern 134 and the preprocess data 135 in the IC chip 110. Incidentally, the authentication key 131 and the registration key 132 may be common key cryptosystem (CKC) type key data or public key cryptosystem (PKC) type key data. The biometric authentication threshold 133 is a threshold used for determining the feasibility of biometric authentication in the inside of the IC chip 110.

The registration pattern 134 is user's biometric information data registered in the IC chip 110. The registration pattern 134 is managed by the processor 115 so that the registration pattern 134 is not output to the outside of the IC chip 110 after registration.

The preprocess data 135 is readable data used when the biometric authentication device 200 performs a preprocess of biometric authentication. The preprocess data 135 paired with the registration pattern 134 is registered in the IC chip 110. The term 'preprocess' means part of a biometric authentication process, such as a process of correcting the position of a verification pattern, which is performed by the biometric authentication device 200 before the biometric authentication process in the IC chip 110. For example, the preprocess data 135 is data as part of the registration pattern 134 or data concerned with the reference coordinate values of the registration pattern such as the central coordinate values of whorls of a fingerprint. The preprocess data 135 is used for correcting the position of the verification pattern created by the biometric authentication device 200.

The data of the residual number of trials 136 is data indicating the number of authentication failures allowed for the biometric authentication process executed by the IC chip 110. For example, a predetermined value (initial value) such as '3' is set as the data of the residual number of trials 136 in advance. The processor 115 decreases the value whenever the biometric authentication process fails. When the value reaches zero, the biometric authentication process is disabled from being executed any more.

An authentication flag 141, a registration flag 142, a subtraction flag 143 and a verification pattern 144 are stored in the volatile data storage memory 114. These data are volatile data managed by the processor 115 based on the biometric authentication program 121.

The authentication flag 141 is a flag indicating a result of device authentication using the authentication key 131. In this embodiment, the authentication flag 141 of 'ON' indicates that device authentication using the authentication key 131 has succeeded, whereas the authentication flag 131 of 'OFF' indicates that device authentication using the authentication key 131 has not been executed or has failed. The registration flag 142 is a flag indicating a result of device authentication using the registration key 132. In this embodiment, the registration flag 142 of 'ON' indicates that device authentication using the registration key 132 has succeeded, whereas the registration flag 142 of 'OFF' indicates that device authentication using the registration key 132 has not been executed or has failed. The subtraction flag 143 is a flag indicating whether or not the residual number of trials 136 has been decreased before the preprocess data is sent to the biometric authentication device 200. In this embodiment, the subtraction flag 143 of 'ON' indicates that the residual number of trials 136 has been decreased, whereas the subtraction flag 143 of 'OFF' indicates that the residual number of trials 136 has not been decreased.

Incidentally, the initial values of the authentication flag 141, the registration flag 142 and the subtraction flag 143 are all 'OFF'. Other data may be used for indicating a result of device authentication and whether the residual number of trials has been decreased, regardless of whether the flags are 'ON' or 'OFF'.

The verification pattern 144 is biometric information data which is created by the biometric authentication device 200 and which is used when the IC chip 110 performs biometric authentication. The verification pattern 144 is data which is temporarily stored for biometric authentication performed by the IC chip 110. It is preferable that the verification pattern 144 is deleted after the biometric authentication is completed.

Figure 2A:
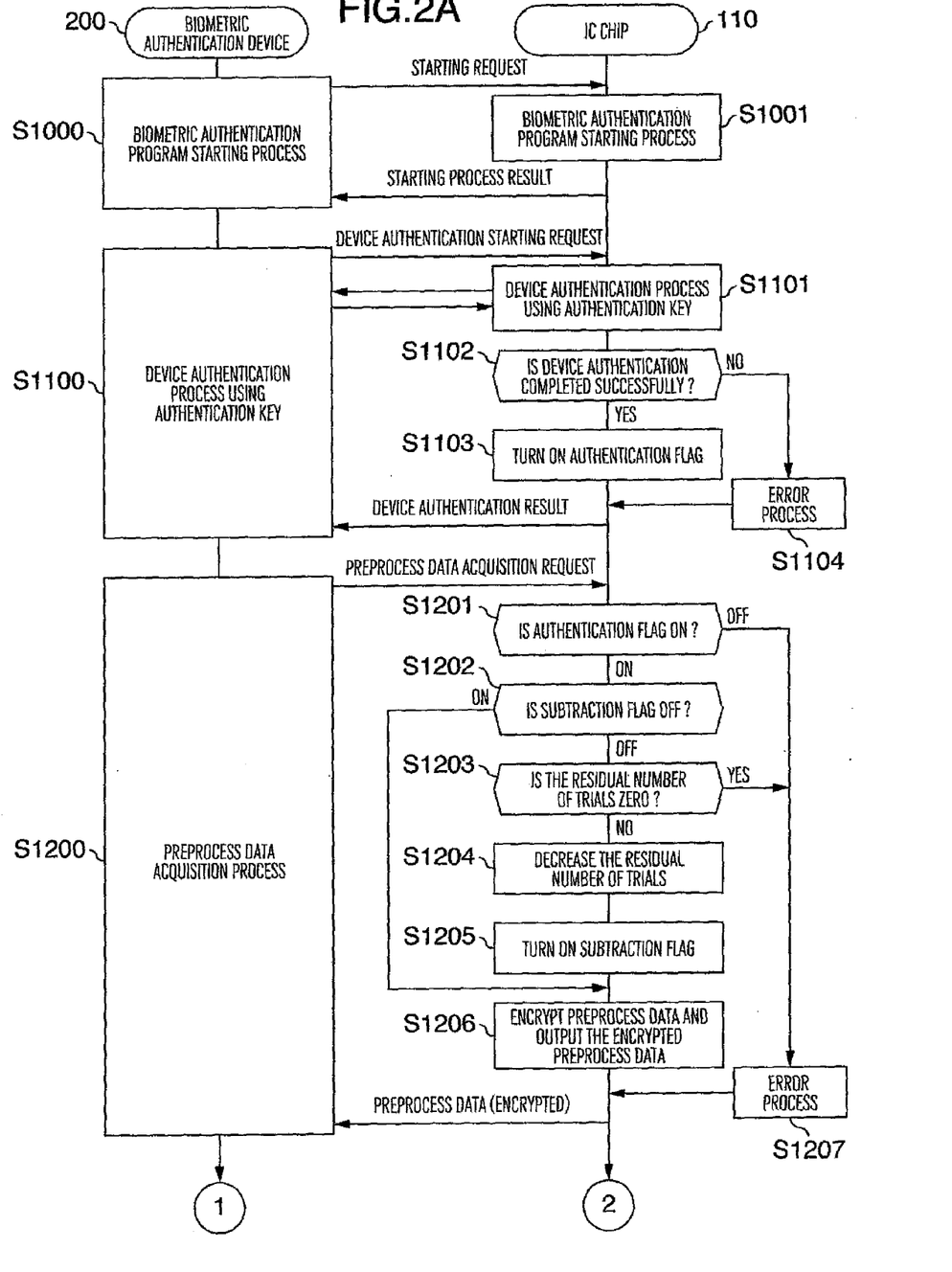
FIG. 2A is a flow chart showing an example of a biometric authentication process performed between an IC chip and a biometric authentication device.
Figure 2B:
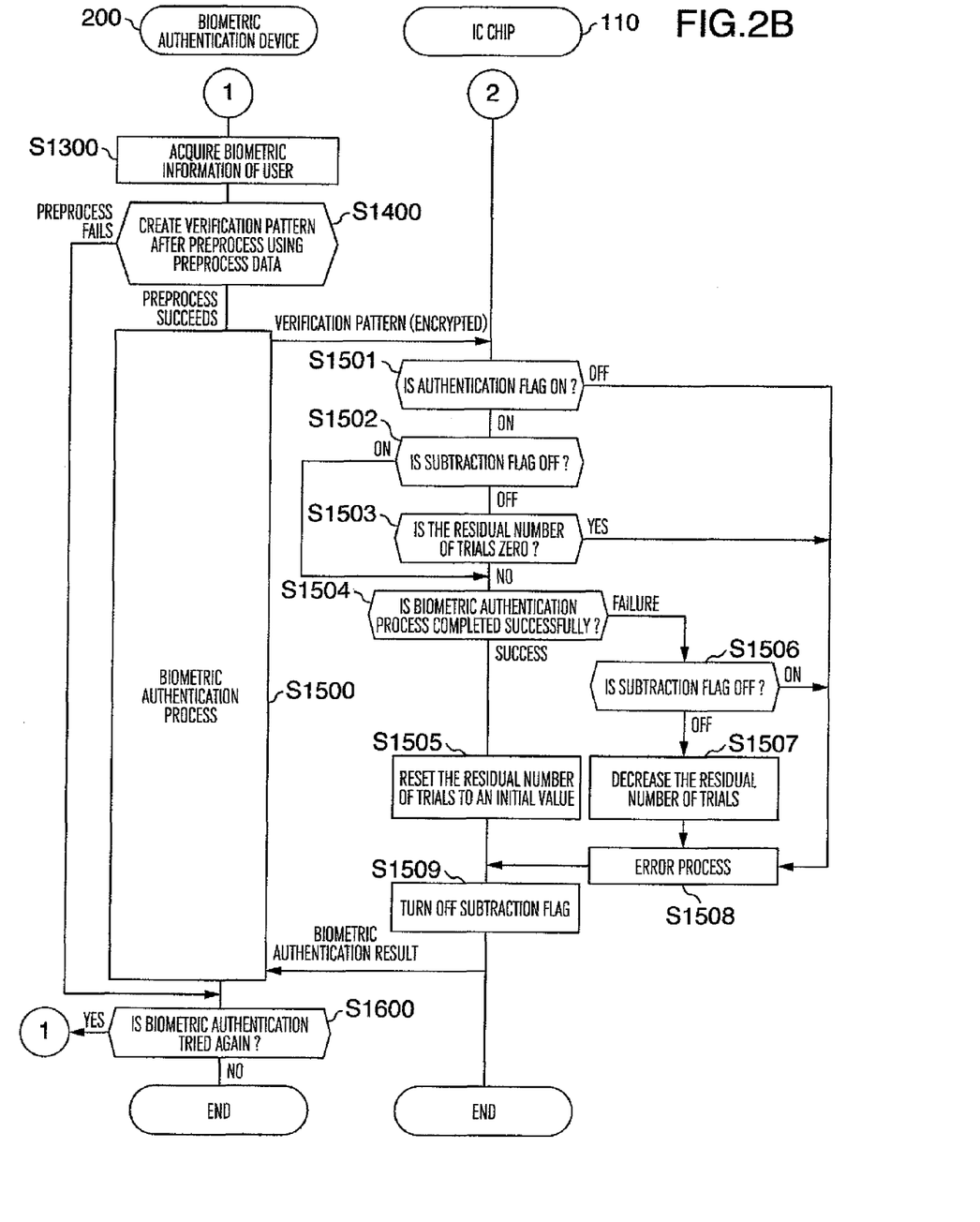
FIG. 2B is a flow chart showing an example of the biometric authentication process performed between the IC chip and the biometric authentication device.

An example of the biometric authentication process performed between the IC chip 110 and the biometric authentication device 200 will be described next with reference to FIGS. 2A and 2B. FIG. 2A shows an example of a flow of processing before the biometric authentication device 200 acquires preprocess data 135. FIG. 2B shows an example of a flow of a biometric authentication process after the biometric authentication device 200 acquires the preprocess data 135. The following processes are executed by the processors 115 and 206 based on programs stored in the nonvolatile data storage memory 113 and the memory 202, respectively.

When the IC card 100 including the IC chip 110 is inserted in the biometric authentication device 200, the biometric authentication device 200 sends a request to the IC chip 110 to start the biometric authentication program 121 and acquires a result of the biometric authentication program starting process from the IC chip 110 (step S1000). Incidentally, when the IC chip 110 is mounted in a mobile terminal, the biometric authentication device 200 sends a starting request to the mobile terminal when the biometric authentication device 200 receives a predetermined signal from the mobile terminal or the mobile terminal is set in a predetermined place of the biometric authentication device 200.

Upon reception of the biometric authentication program starting request from the biometric authentication device 200, the IC chip 110 performs a process of starting the biometric authentication program 121 and then sends a result of the starting process to the biometric authentication device 200 (step S1001). Incidentally, an initializing process may be performed in accordance with necessity while the process of starting the biometric authentication program 121 is performed.

Upon reception of the starting process result, the biometric authentication device 200 sends a device authentication starting request to the IC chip 110 to perform a device authentication process and acquires a result of device authentication from the IC chip 110 (step S1100). Here, key data (not shown) paired with the authentication key 131 is stored in the memory 202 of the biometric authentication device 200, so that a device authentication process for the IC chip 110 is executed based on the key data. Key data temporarily used for encrypting data transmitted/received in the following communication may be shared in the device authentication process. The key data may be created based on the authentication key or may be created at random. The IC chip 110 and the biometric authentication device 200 may transmit key data to each other or either of the IC chip 110 and the biometric authentication device 200 may transmit key data to the other. Incidentally, cryptographic algorism using device authentication and key data sharing algorism are not limited. Any algorism may be used.

Upon reception of the device authentication starting request from the biometric authentication device 200, the IC chip 110 turns off the authentication flag 141 and then executes a device authentication process using the authentication key 131 (step S1101). The IC chip 110 determines whether device authentication has succeeded or not (step S1102). When the IC chip 110 determines that device authentication has succeeded, the IC chip 110 turns on the authentication flag 141 (step S1103) and sends a result to the biometric authentication device 200. On the other hand, when the IC chip 110 determines that device authentication has failed, the IC chip 110 performs an error process and terminates the process while keeping the authentication flag 'OFF' (step S1104).

For example, the error process in steps S1104, S1207 and S1508 is a process for storing an error log in the IC chip 110 and sending an error code to the biometric authentication device 200.

Upon reception of a result indicating success in device authentication from the IC chip 110, the biometric authentication device 200 sends a preprocess data acquisition request to the IC chip 110 and acquires preprocess data 135 from the IC chip 110 (step S1200). Here, the preprocess data 135 is encrypted with the authentication key 131 or temporary key data created by the device authentication process. The biometric authentication device 200 decrypts the acquired preprocess data 135. Because the IC chip 110 sends the preprocess data encrypted in this manner, the preprocess data 135 flowing on the communication path can be protected.

Upon reception of the preprocess data acquisition request from the biometric authentication device 200, the IC chip 110 checks whether the authentication flag 141 is 'ON' or 'OFF' (step S1201). When the authentication flag 141 is 'OFF', the IC chip 110 performs an error process (step S1207) because device authentication has not been executed or has failed. When the authentication flag 141 is 'ON', the IC chip 110 checks whether the subtraction flag 143 is 'ON' or 'OFF' (step S1202).

When the subtraction flag 143 is 'ON', the IC chip 110 goes to step S1206, encrypts the preprocess data 135 with the authentication key 131 or temporary key data created based on the authentication key 131 and sends the encrypted preprocess data 135 to the biometric authentication device 200 because the residual number of trials 136 has been already decreased. On the other hand, when the subtraction flag 143 is 'OFF', the IC chip 110 checks the value of the residual number of trials 136 (step S1203) because the residual number of trials 136 has not been decreased yet. When the residual number of trials 136 is zero, the IC chip 110 regards the biometric authentication process as being forbidden and goes to step S1207. The IC chip 110 performs an error process and then terminates the process without sending the preprocess data 135 to the biometric authentication device 200. On the other hand, when the residual number of trials 136 is larger than zero, the IC chip 110 regards the biometric authentication process as being permitted and goes to step S1204. In the step S1204, the IC chip 110 decreases the residual number of trials 136 by 1. Then, the IC chip 110 turns on the subtraction flag 143 (step S1205) and sends the preprocess data 135 to the biometric authentication device 200 (step S1206).

Because the residual number of trials 136 is decreased in this manner when the IC chip 110 sends the preprocess data 135 to the biometric authentication device 200 regardless of whether the IC chip 110 fails in the biometric authentication process, the preprocess data 135 can be prevented from being acquired many times illegally. Consequently, security can be improved.

Upon acquisition of the preprocess data 135, the biometric authentication device 200 acquires user's biometric information by using the biometric sensor 203 (step S1300). The biometric authentication device 200 performs a preprocess of biometric authentication by using the acquired user's biometric information and the preprocess data 135 acquired from the IC chip 110 to thereby create a verification pattern 144 (step S1400). When the preprocess in the step S1400 failed, for example, because the user's biometric information could not be acquired correctly, the biometric authentication device 200 goes to step S1600 without sending the verification pattern 144.

When the preprocess has succeeded, the biometric authentication device 200 sends the verification pattern 144 to the IC chip 110 (step S1500). On this occasion, the verification pattern 144 is sent to the IC chip 110 after encrypted with the authentication key 131 or temporary key data created by the device authentication process. In this manner, the verification pattern 144 flowing on the communication path can be protected.

Upon reception of the verification pattern 144 from the biometric authentication device 200, the IC chip 110 checks the status of the authentication flag 141 (step S1501). When the authentication flag 141 is 'ON', the IC chip 110 determines that device authentication has succeeded, and goes to step S1502. When the authentication flag 141 is 'OFF', the IC chip 110 determines that device authentication has not been executed or has failed, and goes to step S1508.

In the step S1502, the IC chip 110 checks the status of the subtraction flag 143. When the subtraction flag 143 is 'ON', the IC chip 110 goes to step S1504 without checking the residual number of trials 136 because the residual number of trials 136 has been already decreased. On the other hand, when the subtraction flag 143 is 'OFF', the IC chip 110 checks the residual number of trials 136 (step S1503). When the residual number of trials 136 is zero, the IC chip 110 executes an error process (step S1508) because the IC chip 110 determines that the biometric authentication process is disabled from being executed. It is preferable that the use of the IC chip 110 is forbidden by the error process. On the other hand, when the residual number of trials 136 is larger than zero, the IC chip 110 goes to step S1504 because the IC chip 110 determines that the biometric authentication process is enabled to be executed.

In this manner, checking of the status of the authentication flag in the step S1501 is performed in addition to checking of the status of the authentication flag in the step S1201. Accordingly, even when a verification pattern is transmitted from an illegal device without passing through processing in the step S1201 etc., the authentication process can be prevented from being executed. Incidentally, control may be made so that processing in the step S1501 is omitted within a predetermined time, for example, of 5 minutes after processing in the step S1201.

Figure 3:
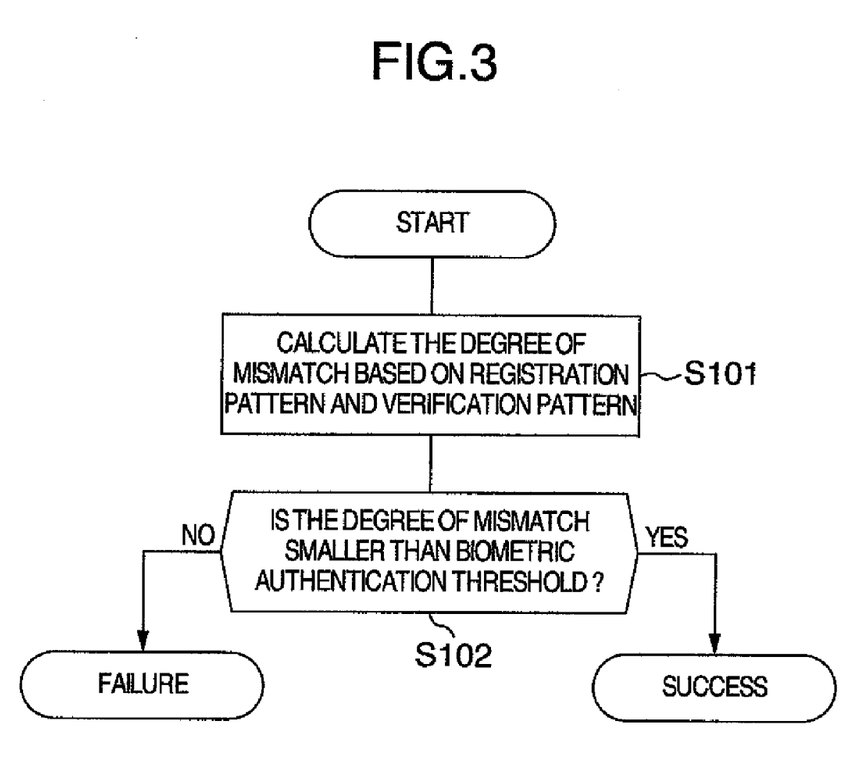
FIG. 3 is a flow chart showing an example of the biometric authentication process executed by the IC chip.

An example of the biometric authentication process in the step S51504 will be described with reference to FIG. 3. First, the processor 115 calculates the degree of mismatch by comparing the verification pattern 144 acquired from the biometric authentication device 200 with the registration pattern 134 held in advance in the nonvolatile data storage memory 113 of the IC chip 110 by use of a predetermined algorithm (step S101). Then, the processor 115 compares the biometric authentication threshold 133 with the degree of mismatch created in the step S101 (step S102). If the degree of mismatch is smaller than the biometric authentication threshold 133, biometric authentication is regarded as having succeeded. Otherwise, biometric authentication is regarded as having failed. Although this embodiment has been described in the case where the degree of mismatch between the registration pattern 134 and the verification pattern 144 is calculated, the invention can be applied to the case where the degree of match is calculated. In this case, biometric authentication is regarded as having succeeded if the degree of match is larger than the biometric authentication threshold 133, and biometric authentication is regarded as having failed if the degree of match is not larger than the biometric authentication threshold 133.

The biometric authentication process is executed (step S1504). When authentication has succeeded, the residual number of trials 136 is reset to an initial value (step S1505). Alternatively, it may be designed that the residual number of trials 136 is not reset but increased by a predetermined value so that the residual number of trials 136 does not exceed the initial value.

On the other hand, when the biometric authentication process has failed, the subtraction flag 143 is checked in order to decrease the residual number of trials 136 (step S1506). If the subtraction flag 143 is 'ON' which indicates that the residual number of trials 136 has been already decreased, an error process is performed without any subtraction process (step S1508). If the subtraction flag 143 is 'OFF', the residual number of trials 136 is decreased by 1 (step S1507) and an error process is performed (step S1508). It is preferable that a process of forbidding the use of the IC chip 110 is performed if the residual number of trials 136 is decreased to zero.

After processing in the step S1505 or S1508, the subtraction flag 143 is turned off (step S1509) and a result of biometric authentication is sent back to the biometric authentication device 200. On this occasion, 'success' is sent as a result of biometric authentication when the step S1505 is executed, and 'failure' is sent as a result of biometric authentication when the step S1508 is executed. In this manner, even when authentication has failed, the subtraction flag 143 is turned off and the residual number of trials 136 is decreased whenever the preprocess data 135 is re-transmitted unless biometric authentication has succeeded. Accordingly, the preprocess data can be prevented from being acquired illegally many times.

When execution of biometric authentication is selected again by the user through the user interface portion 204 (step S1600) after the biometric authentication device 200 acquires the result of biometric authentication from the IC chip 110, the biometric authentication device 200 goes back to step S1300.

As described above, security can be improved because control is made so that the process of outputting the preprocess data 135 and the biometric authentication process are not executed unless device authentication has succeeded. Moreover, the IC chip 110 decreases the residual number of trials 136 when the IC chip 110 outputs the preprocess data 135. Accordingly, even when the biometric authentication device 200 has failed in the preprocess and the biometric authentication process has not been executed in the inside of the IC chip 110, the residual number of trials 136 can be decreased. Incidentally, even when the biometric authentication process in the inside of the IC chip 110 is executed repeatedly after reading of the preprocess data 135 from the IC chip 110 is performed, the residual number of trials 136 can be decreased whenever biometric authentication fails.

Assume now that an attacker executes biometric authentication repeatedly by using illegal biometric information in the IC chip 110. In this case, even when the verification pattern received by the IC chip 110 is so illegal that the biometric authentication process in the step S1500 fails, the IC chip 110 decreases the residual number of trials 136. For this reason, when attack using illegal biometric information is executed repeatedly, the residual number of trials 136 reaches zero finally to thereby disable the process of outputting the preprocess data 135 and the biometric authentication process using the IC chip 110. Accordingly, such repeated attack can be prevented from being executed infinitely, so that security can be improved. Moreover, as described above, the preprocess data can be prevented from being acquired illegally many times though biometric authentication has failed. Alternatively, a process of decreasing the residual number of trials when there is no verification pattern received within a predetermined time after the IC chip 110 sends the preprocess data may be added to the processing flow shown in FIGS. 2A and 2B.

Although this embodiment has been described in the case where the residual number of trials 136 is decreased when the IC chip 110 receives a preprocess data acquisition request, the residual number of trials 136 may be decreased in another timing before the IC chip 110 outputs the preprocess data 135. For example, the residual number of trials 136 may be decreased immediately after a mutual authentication process has succeeded.

Although the embodiment shown in FIGS. 2A and 2B has been described in the case where the biometric authentication device 200 executes the process (step S1200) of acquiring the preprocess data and then executes the process (step S1300) of acquiring user's biometric information by using the biometric sensor 203, the order of execution of the steps S1200 and S1300 may be reversed.

A biometric information registration process for registering the registration pattern 134 and the preprocess data 135 in the IC chip 110 will be described next with reference to FIGS. 4A and 4B. This process is performed before execution of the biometric authentication process. Incidentally, the same process as in FIGS. 2A and 2B is referred to by the same reference character for the sake of omission of duplicated description.

If the process of registering biometric information in the IC chip 110 can be executed freely, there is a possibility that spoofing will be made for registering biometric information of a third person other than the user of the IC chip 110. It is therefore preferable that the biometric authentication device 200 for performing this process is put on a bank's counter or the like so as to be directly or remotely operated by an operator which is a person in charge having the authority to register biometric information in the IC chip 110. Although this embodiment has been described in the case where the biometric authentication device 200 used for the biometric authentication process is used for registration of biometric information, the invention is not limited thereto and another device may be used for registration of biometric information.

First, when the IC card 100 having no registration pattern 134, etc. stored in the memory is inserted in the biometric authentication device 200 after an operator confirms legality of the user by predetermined means such as means of showing the user's ID card, the biometric authentication program is started and the device authentication process is executed (steps S1000, S1001 and S1100 to S1104). Incidentally, when the biometric authentication device 200 is remotely operated by the operator, the legality of the user is judged based on the user's ID card and a user's face image, for example, taken by a camera mounted in the biometric authentication device 200.

Then, the biometric authentication device 200 sends a device authentication starting request to the IC chip 110 to perform a device authentication process using the registration key 132 and acquires a result of device authentication from the IC chip 110 (step S2200). On this occasion, key data paired with the registration key 132 is stored in the memory 202 of the biometric authentication device 200 so that the device authentication process for registration of biometric information can be performed. Incidentally, cryptographic algorism used for device authentication is not limited and any algorism may be used.

Upon reception of the device authentication starting request using the registration key 132 from the biometric authentication device 200, the IC chip 110 turns off the registration flag 142 and executes the device authentication process using the registration key 132 (step S2202).

When the device authentication has succeeded, the IC chip 110 turns on the registration flag 142 (step S2203). When the device authentication has failed, the IC chip 110 executes an error process (S2204).

When the error process is performed, the registration flag 142 is kept 'OFF'. Incidentally, the error process in the step S2204, S2404 or S2505 is the same as the error process in the step S1104 or the like, that is, a process of storing an error log in the IC chip 110 and sending an error code to the biometric authentication device 200. However, the error process is not limited thereto and another process may be performed.

The biometric authentication device 200 acquires user's biometric information by using the biometric sensor 203 and creates the preprocess data 135 and the registration pattern 134 (step S2300). After the preprocess data 135 and the registration pattern 134 are created, the biometric authentication device 200 sends the preprocess data 135 to the IC chip 110 and acquires a result of the registration process from the IC chip 110 (step S2400).

Upon reception of the preprocess data 135, the IC chip 110 checks the statuses of the authentication flag 141 and the registration flag 142 (steps S2401 and S2402). When both the authentication flag 141 and the registration flag 142 are 'ON', the IC chip 110 decrypts the received preprocess data 135 with the authentication key 131 or temporary key data created by the device authentication process and stores the decrypted preprocess data 135 in the nonvolatile data storage memory 113 (step S2403). On the other hand, when any one of the authentication flag 141 and the registration flag 142 is 'OFF', the IC chip 110 performs the error process (step S2404).

Upon acquisition of the result of the registration process (step S2400), the biometric authentication device 200 sends the registration pattern 134 to the IC chip 110 and acquires a result of the registration process from the IC chip 101 (step S2500).

In the case where the preprocess data 135 is sent in the step 2400 and the case where the registration pattern 134 is sent in the step S2500, the preprocess data 135 and the registration pattern 134 are encrypted with key data and sent in the same manner as exchange of data in the device authentication process. The key data used in encryption may be the same as or different from that used for the device authentication process. It is preferable that different key data is used in order to further enhance security.

Upon reception of the registration pattern 134, the IC chip 110 checks the statuses of the authentication flag 141 and the registration flag 142 (steps S2501 and S2502). When both the authentication flag 141 and the registration flag 142 are 'ON', the IC chip 110 decrypts the received registration pattern 134 with the authentication key 131 or temporary key data created by the device authentication process and stores the decrypted registration pattern 134 in the nonvolatile data storage memory 113 (step S2503). Then, the initial value of the residual number of trials 136 is set (step S2504). The initial value is not necessarily set after the registration pattern is stored. For example, the initial value may be set before the preprocess data is registered. In addition, the initial value may be set in the IC chip 110 in advance. On the other hand, when either flag is 'OFF', an error process is performed (S2505).

As described above, control is made so that the preprocess data 135 and the registration pattern 134 cannot be registered in the IC chip 110 unless both device authentication using the authentication key 131 and device authentication using the registration key 132 have succeeded. Accordingly, the registration pattern or the like can be prevented from being registered illegally, so that security can be improved.

Figure 5A:
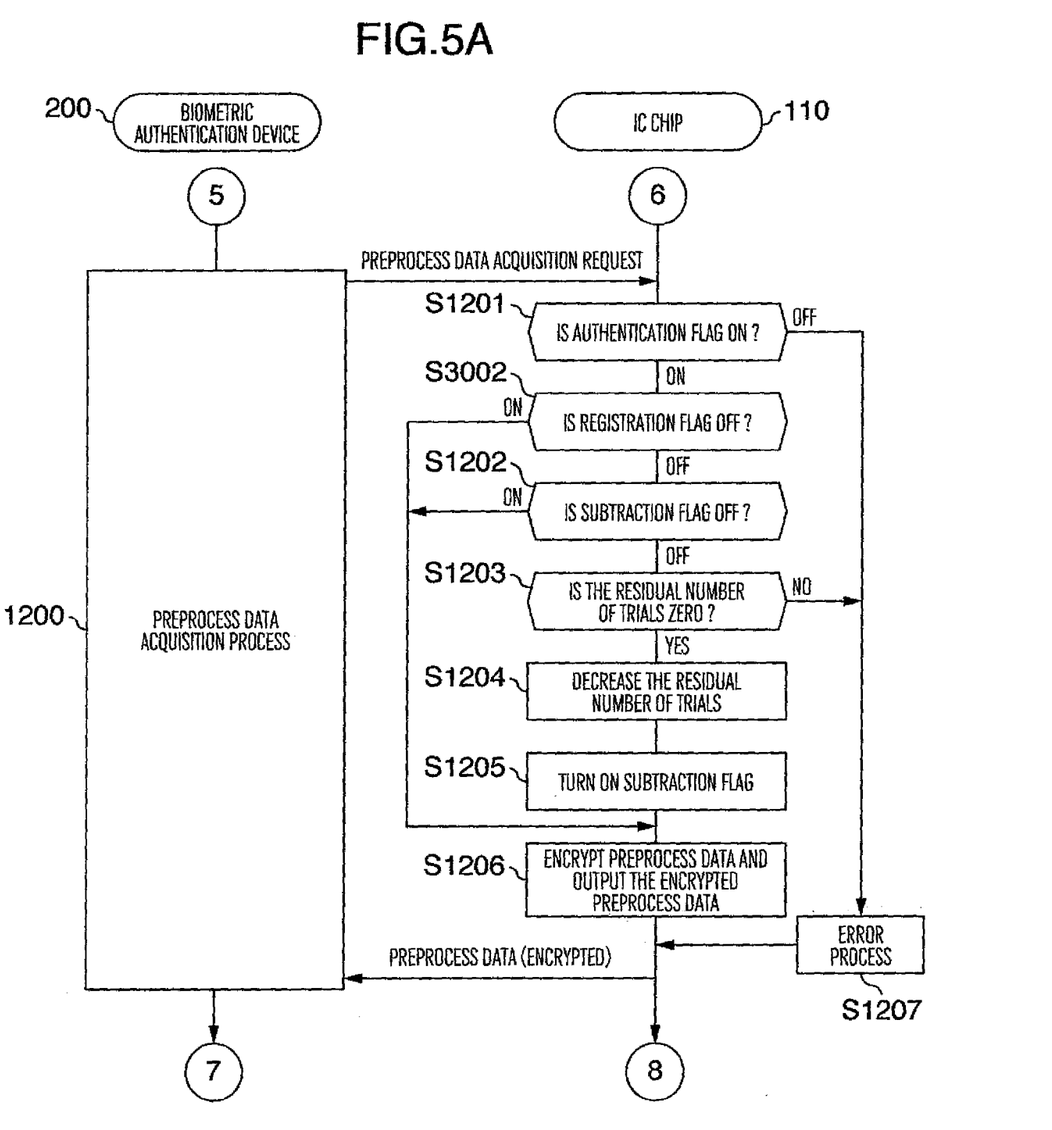
FIG. 5A is a flow chart showing an example of a biometric information registration confirmation process executed after registration of the preprocess data and the registration pattern.
Figure 5B:
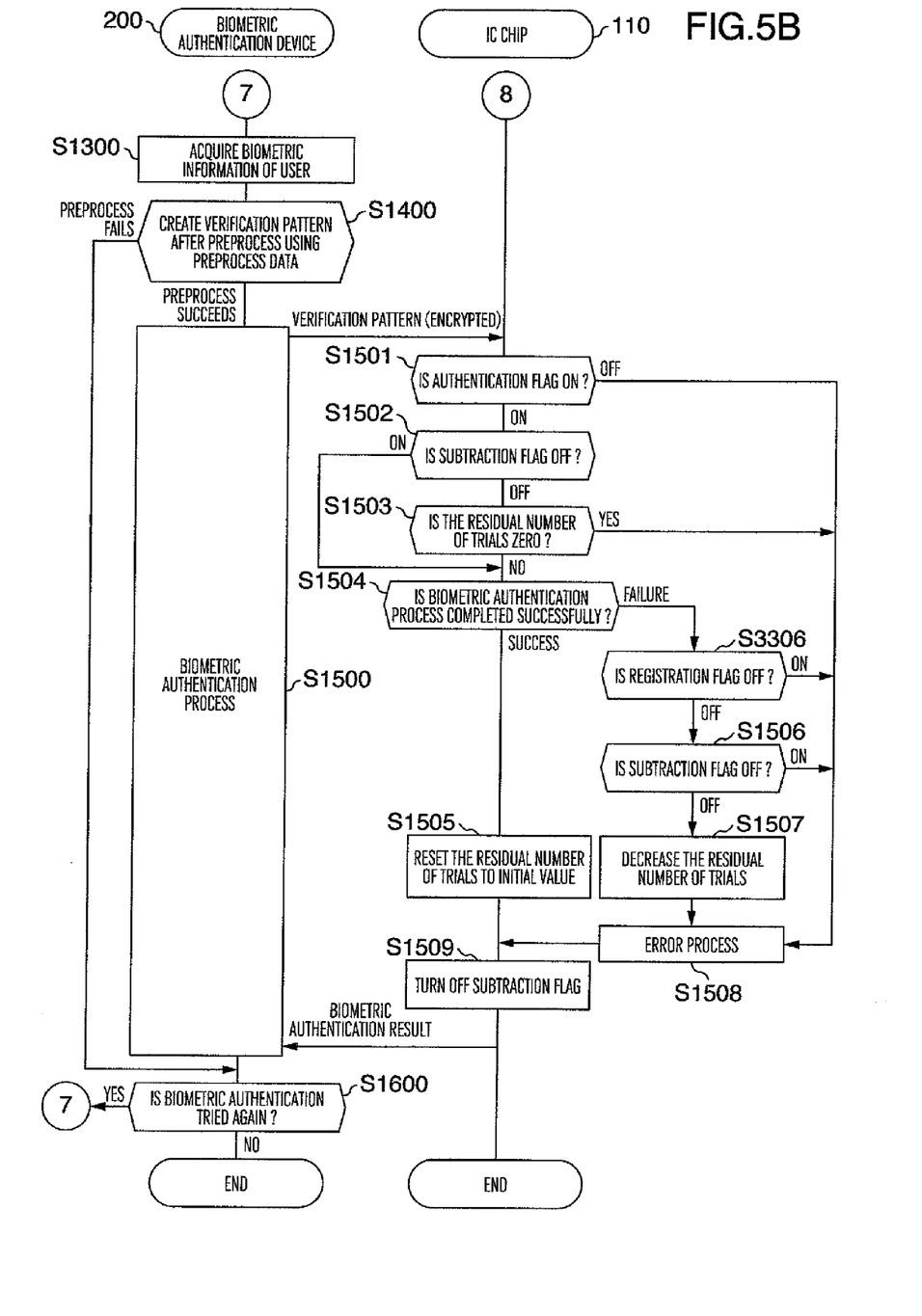
FIG. 5B is a flow chart showing an example of the biometric information registration confirmation process executed after registration of the preprocess data and the registration pattern.

A flow of a biometric information registration confirmation process executed after registration of the preprocess data and the registration pattern will be described next with reference to FIGS. 5A and 5B. In FIGS. 5A and 5B, the same process as in FIGS. 2A and 2B is referred to by the same reference character for the sake of omission of duplicated description.

This embodiment is placed on the assumption that the user performs biometric authentication by using the IC chip 110 on site to confirm registration of correct data in the IC chip 110 after registering biometric information data such as a registration pattern in the IC chip 110 by using the biometric authentication device 200 put on a bank's counter or the like.

On this occasion, if the user is inexperienced in biometric authentication, there is a possibility that biometric authentication for confirmation of registration of biometric information may fail even when the process of registering biometric information in the IC chip 110 is performed correctly. In the biometric authentication process shown in FIGS. 2A and 2B, the residual number of trials 136 is decreased because the possibility of spoofing is high when biometric authentication fails. However, when the biometric authentication process is performed immediately after the registration process is performed, the possibility of spoofing is very low even when authentication fails. If the residual number of trials 136 in the IC chip 110 is decreased in this case, there is a possibility that the residual number of trials 136 may reach zero because the biometric authentication process fails repeatedly while registration of biometric information is confirmed. When the residual number of trials 136 reaches zero, the biometric authentication process using the IC chip 110 is disabled from being executed. For this reason, user-friendliness in the biometric information registration process is lowered because re-registration must be performed. Therefore, though the residual number of trials 136 is decreased when the ordinary biometric authentication process has failed, the residual number of trials 136 is not decreased even when biometric authentication for confirmation of registration of biometric information has failed in confirmation of the registration process.

Specifically, the example shown in FIG. 5A is different from the preprocess data acquisition process shown in FIG. 2A in that a process (step S3002) of confirming the status of the registration flag 142 is additionally provided after confirmation of the status of the authentication flag 141 in the step S1201. In this example, when the registration flag 142 is 'ON', the IC chip 110 sends the preprocess data to the biometric authentication device 200 without decrease in the residual number of trials 136 regardless of the status of the subtraction flag 143.

Figure 4A:
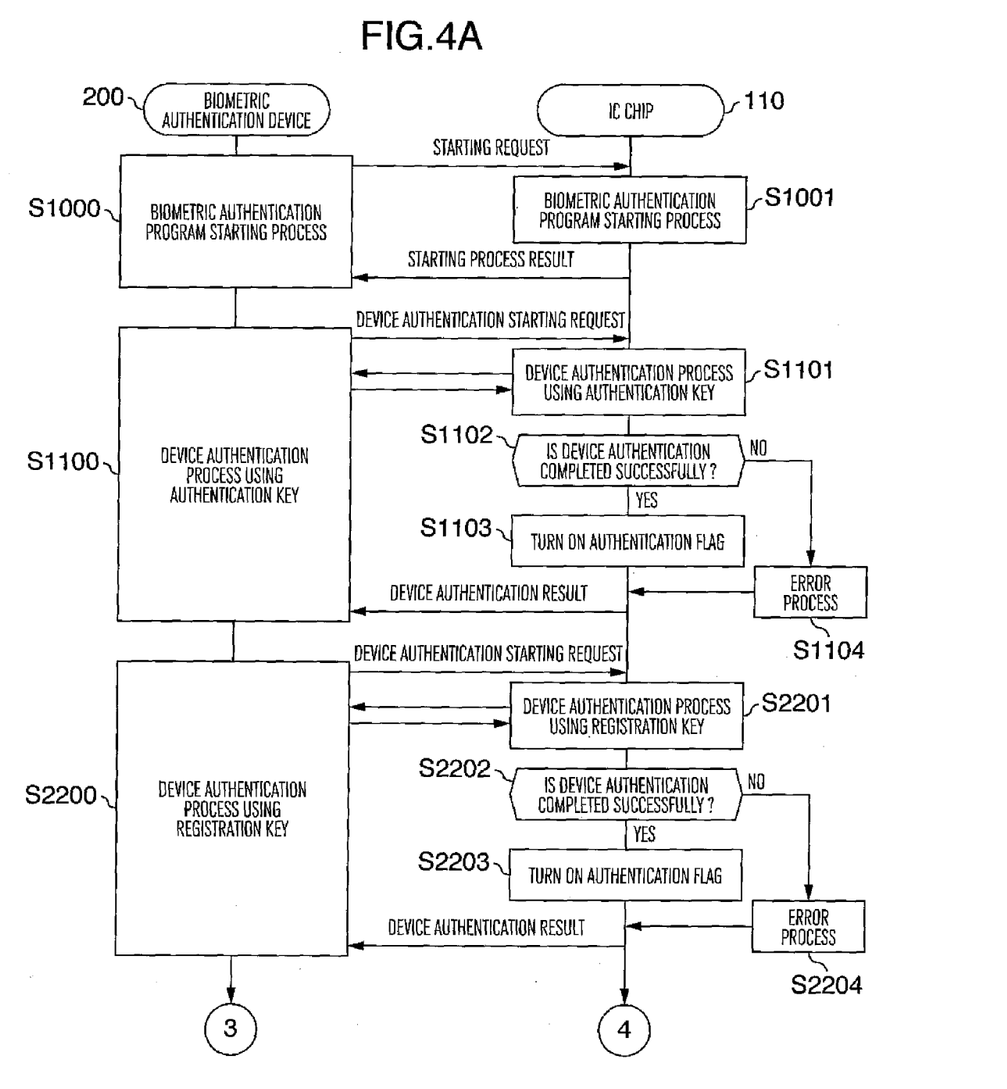
FIG. 4A is a flow chart showing an example of a biometric information registration process for registering a registration pattern and preprocess data in the IC chip.
Figure 4B:
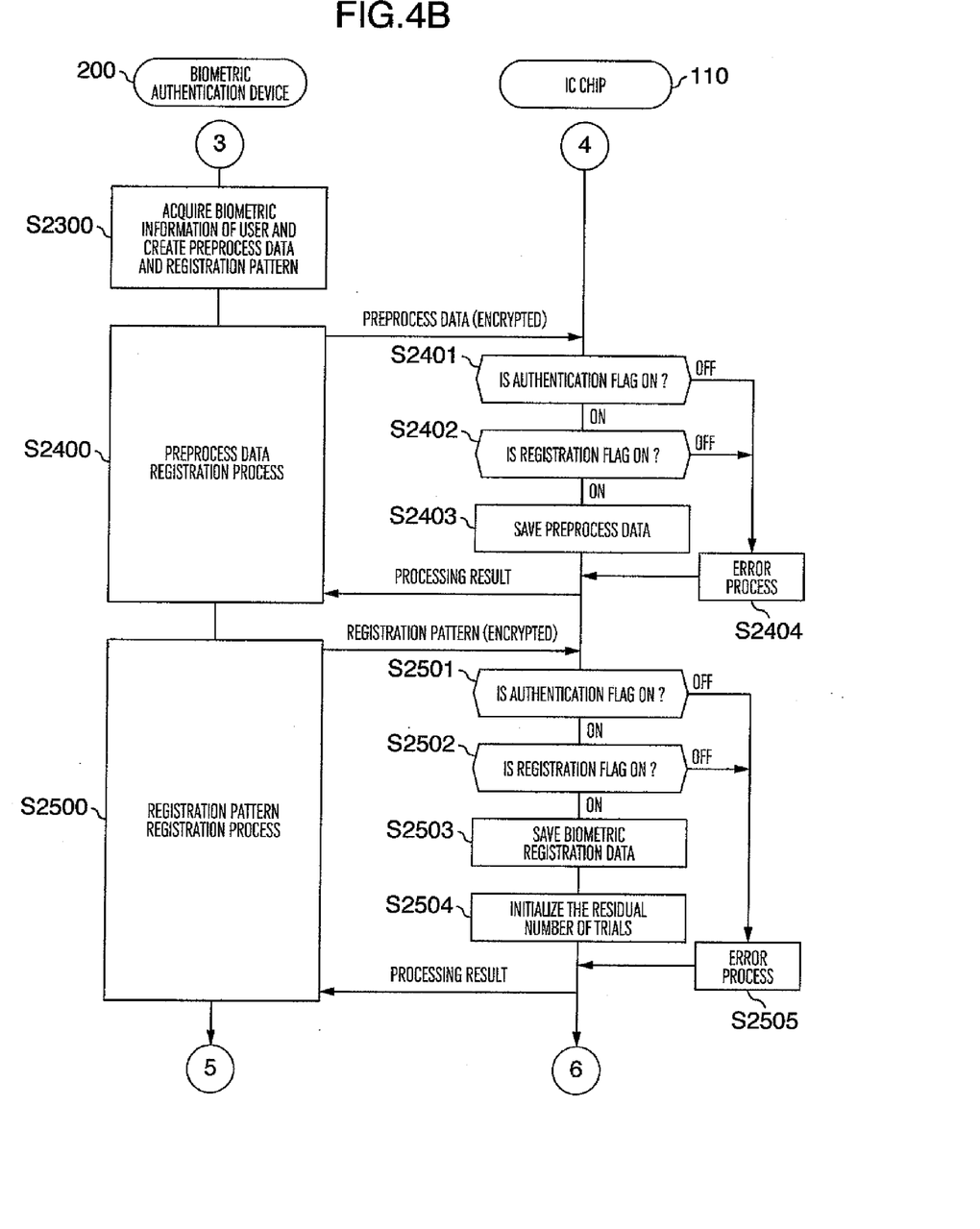
FIG. 4B is a flow chart showing an example of the biometric information registration process for registering the registration pattern and preprocess data in the IC chip.

Incidentally, control may be made so that the registration flag is 'ON' during a predetermined period, for example, 20 minutes after the registration pattern is stored in the IC chip 110 in FIGS. 4A and 4B but the registration flag is turned 'OFF' automatically after the predetermined period. Or the operator has an authentication terminal having ID, etc. stored therein and the registration flag may be turned 'OFF' automatically when the biometric authentication device 200 or the IC chip 110 detects that the authentication terminal gets out of a predetermined range, for example, of 2 meters distant from the biometric authentication device 200 or the IC chip 110.

The example shown in FIG. 5B is different from the process shown in FIG. 2B in that a process of checking the status of the registration flag 142 is additionally provided before the process of checking the subtraction flag 143 when the biometric authentication process in the step S1504 has failed. In this example, when the registration flag 142 is 'ON', an error process is performed without decrease in the residual number of trials 136 regardless of the status of the subtraction flag 143.

As described above, even when biometric authentication has failed, the residual number of trials 136 is not decreased as long as device authentication using the registration key 132 has succeeded. Accordingly, even when the biometric authentication process for confirmation of registration of biometric information fails repeatedly, the biometric authentication process using the IC chip 110 is not disabled from being executed. Accordingly, convenience of the registration process can be improved.

Incidentally, the order of execution of the steps S1200 and S1300 may be reversed like the example shown in FIGS. 2A and 2B.

Figure 6:
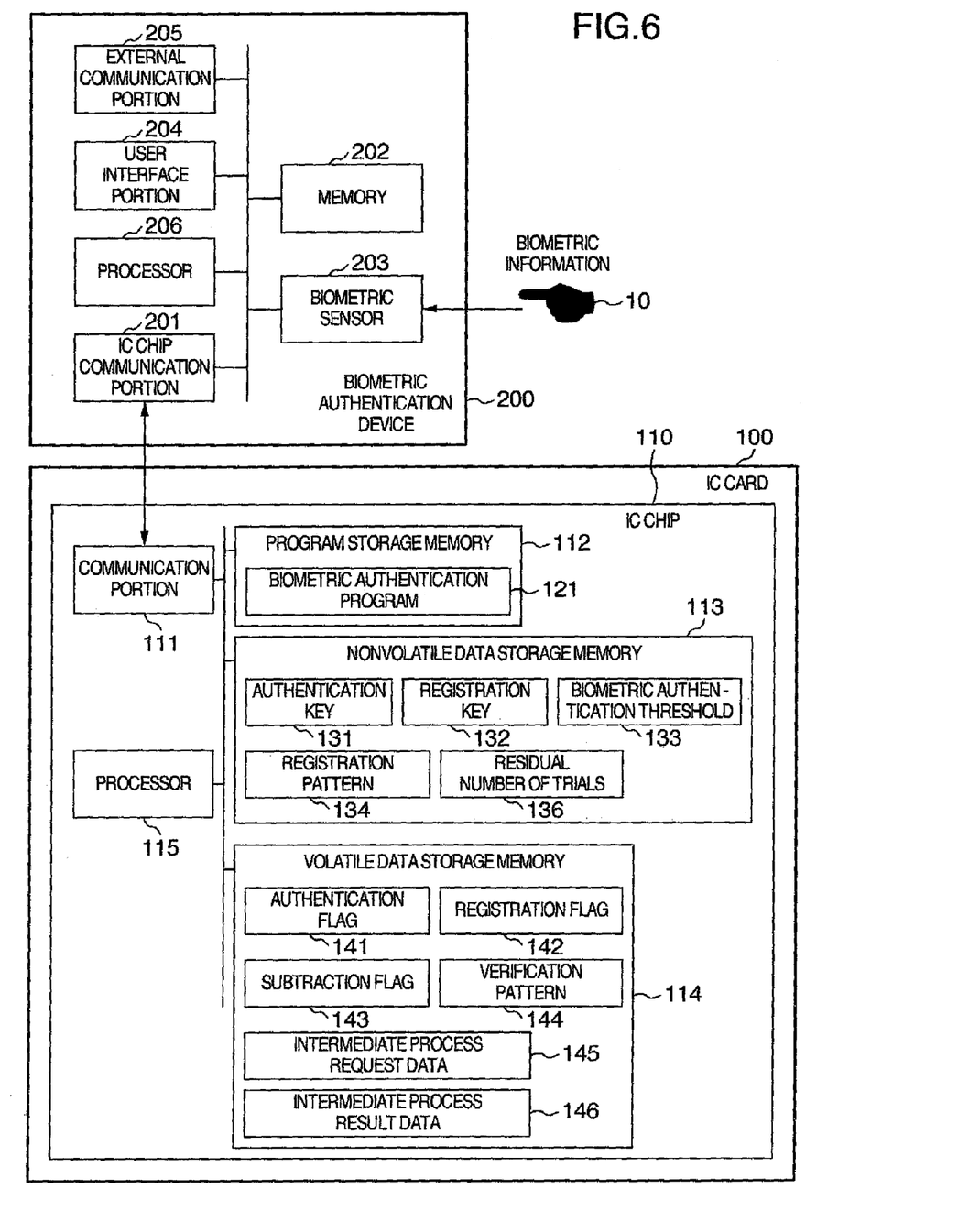
FIG. 6 is a configuration diagram showing an example of a biometric authentication system.
Figure 7:
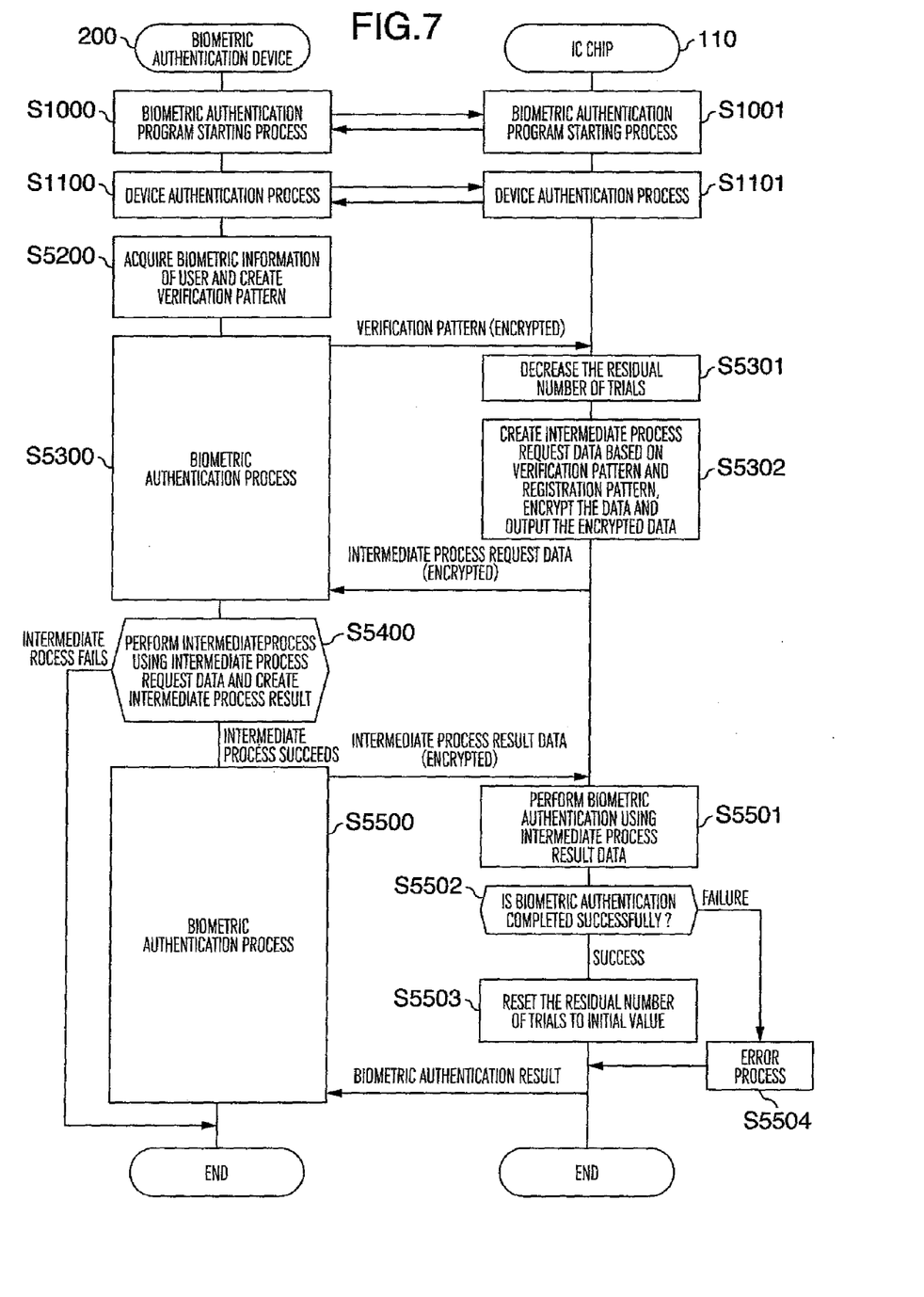
FIG. 7 is a flow chart showing an example of a biometric authentication process performed between an IC chip and a biometric authentication device.

The case where an intermediate process is performed in place of the preprocess in the biometric authentication device 200 will be described next with reference to FIGS. 6 and 7. In FIGS. 6 and 7, the same configuration or process as in FIGS. 1, 2A and 2B is referred to by the same reference character for the sake of omission of duplicated description.

The example of the IC chip shown in FIG. 6 is different from the example shown in FIG. 1 in that the preprocess data 135 is not stored in the nonvolatile data storage memory 113 but intermediate process request data 145 and intermediate process result data 146 are stored instead in the volatile data storage memory 114 of the IC chip 110. Here, the intermediate process request data 145 is request data for requesting the biometric authentication device 200 to perform part of the biometric authentication process originally performed by the IC chip 110 as an intermediate process. The intermediate process result data 146 is data concerned with a result of the intermediate process performed by the biometric authentication device 200.

In this embodiment, the IC chip 110 does not hold the preprocess data 135. The preprocess using the preprocess data 135 is not performed when the biometric authentication device 200 performs the biometric authentication process. After biometric authentication is started, the IC chip 110 creates the intermediate process request data 145 instead by executing part of the biometric authentication process. Then, the IC chip 110 sends the intermediate process request data 145 to the biometric authentication device 200. Upon reception of the intermediate process request data 145 from the IC chip 110, the biometric authentication device 200 performs the intermediate process based on the intermediate process request data 145. Then, the biometric authentication device 200 sends the intermediate process result data 146 back to the IC chip 110. Upon reception of the intermediate process result data from the biometric authentication device 200, the IC chip 110 performs residual part of the biometric authentication process based on the received intermediate process result data. In this manner, part of the biometric authentication process originally performed by the IC chip 110 can be performed by the biometric authentication device 200, so that processing load imposed on the IC chip 110 can be reduced.

In this example, the residual number of trials 136 is decreased when the biometric authentication process has failed in any timing of before the intermediate process, in the intermediate process and after the intermediate process.

A flow of the biometric authentication process in this example will be described below with reference to FIG. 7.

After the starting process and the device authentication process are executed in steps S1000, S1001, S1100 and S1101, the biometric authentication device 200 acquires user's biometric information by using the biometric sensor 203, creates the verification pattern 144 based on the acquired user's biometric information (step S1300) and sends the created verification pattern 144 to the IC chip 110 (step S5300).

Upon reception of the verification pattern 144 from the biometric authentication device 200, the IC chip 110 decreases the residual number of trials 136 (step S5301) and then creates the intermediate process request data 145 by performing part of the biometric authentication process based on the verification pattern 144 and the registration pattern 134 (step S5302). Then, the IC chip 110 sends the intermediate process request data 145 to the biometric authentication device 200.

Upon reception of the intermediate process request data 145 from the IC chip 110 (step S5300), the biometric authentication device 200 performs the intermediate process based on the intermediate process request data 145 and creates the intermediate process result data 146 (step S5400). When the intermediate process has failed on this occasion, the biometric authentication device 200 terminates the biometric authentication process without sending the intermediate process result data 146 to the IC chip 110.

After the intermediate process result data 146 is created, the biometric authentication device 200 sends the intermediate process result data 146 to the IC chip 110 to make the IC chip 110 to execute residual part of the biometric authentication process and acquires the biometric authentication result from the IC chip 110 (step S5500).

Upon reception of the intermediate process result data 146 from the biometric authentication device 200, the IC chip 110 performs residual part of the biometric authentication process based on the intermediate process result data 146 (step S5501). The IC chip 110 checks whether the biometric authentication process has succeeded or not (step S5502). When the biometric authentication process has succeeded, the residual number of trials 136 is reset to an initial value (step S5503). Alternatively, the residual number of trials 136 may be increased by a predetermined value so that the residual number of trials 136 does not exceed the initial value.

On the other hand, when the biometric authentication process has failed, a predetermined error process is performed (step S5504). For example, the error process is a process of storing an error log in the IC chip 110 and sending an error code back to the biometric authentication device 200. Though not shown in the example of FIG. 7, the status of the authentication flag 141, etc. may be checked in the same manner as in the steps S1201 and S1501 in the example of FIGS. 2A and 2B before creation of the intermediate process request data in the step 5302 and before the biometric authentication process in the step S5501. That is, control may be made so that an error process is performed to disable execution of the biometric authentication process unless device authentication has succeeded.

In the aforementioned flow of the biometric authentication process, the IC chip 110 decreases the residual number of trials 136 at the time of start of the biometric authentication process. Accordingly, even when the intermediate process of biometric authentication performed by the biometric authentication device 200 has failed (step S5400) and the biometric authentication process in the inside of the IC chip 110 has not been executed through to the end, the residual number of trials 136 is decreased. Accordingly, if attack using illegal biometric information is executed repeatedly, the residual number of trials 136 reaches zero finally. Such repeated attack can be prevented from being executed infinitely, so that security can be improved.

Although description has been made in the case where the value subtracted from the residual number of trials 136 is 1, the value is not limited to 1. For example, the residual number of trials 136 may be decreased by a predetermined value so that the residual number of trials 136 does not become a negative value. Alternatively, the subtrahend in the step S1202 and the subtrahend in the step S1506 may be made different from each other or the subtrahend in the step S5301 and the subtrahend in the step S5503 may be made different from each other. For example, the subtrahend in the step S1202 is set so as to be larger than the subtrahend in the step S1506. In this manner, even when the preprocess data 135 has been acquired by an illegal device, the residual number of authentication trials can be reduced so that security can be improved.

As described above, in accordance with this embodiment, even when part of the biometric authentication process is performed by the outside of the IC chip, the residual number of trials can be reduced appropriately so that attack using illegal biometric information can be prevented from being executed repeatedly.

The foregoing invention has been described in terms of preferred embodiments. However, those skilled in the art will recognize that many variations of such embodiments exist. Such variations are intended to be within the scope of the present invention and the appended claims.

The invention claimed is:

1. A semiconductor element for performing a biometric authentication process by communicating with an external device which obtains biometric information of a user, comprising:
   a communication portion which communicates with the external device;
   a memory which stores a user's biometric information pattern used for execution of the biometric authentication process and a residual number of trials indicating a number of allowed failures in the biometric authentication process; and
   a processor which performs the biometric authentication process,
   wherein the communication portion transmits processing data to the external device so that the external device can use the processing data when the external device executes part of the biometric authentication process,
   wherein the memory stores first data indicating whether the residual number of trials has been decreased or not, while the processing data is fed to the external device after start of communication with the external device,
   wherein the processor:
   decreases the residual number of trials by a predetermined value while a first type of processing data is output to the external device after the communication portion begins to start communication with the external device,
   receives a processing result executed by the external device, which uses the processing data, via the communication portion to determine whether or not the biometric authentication process has succeeded using the received processing result,
   performs the biometric authentication process based on the processing result and decreases the residual number of trials by a predetermined value if the first data indicates that the residual number of trials has not been decreased when the processor has failed in the biometric authentication process, but changes the first data to indicate that the residual number of trials has not been decreased without decreasing the residual number of trials if the first data indicates that the residual number of trials has been decreased,
outputs a second type of processing data after performing the biometric authentication process, and
when the residual number of trials is 0 after the decrease of the residual number, does not execute the biometric authentication process, and
wherein the processing data does not include the biometric information pattern.

2. A semiconductor element according to claim 1, wherein the processing data is disabled from being transmitted to the external device when the residual number of trials is zero.

3. A semiconductor element according to claim 1, wherein:
the processor increases the residual number of trials by a predetermined value or resets the residual number of trials to an initial value when the biometric authentication process has succeeded.

4. A semiconductor element according to claim 1, wherein the processor does not execute the biometric authentication process when the first data indicates that the residual number of trials has not been decreased and the residual number of trials is zero.

5. A semiconductor element according to claim 1, wherein the processor executes the biometric authentication process when the residual number of trials is zero but the first data indicates that the residual number of trials has been decreased.

6. A semiconductor element according to claim 1, wherein:
the first type of processing data is preprocess data which is used when the external device executes part of the biometric authentication process before the processor executes the biometric authentication;
the communication portion receives a verification pattern of the biometric information corrected based on the preprocess data as the processing result from the external device; and
the processor executes the biometric authentication process by using the verification pattern and the biometric information pattern.

7. A semiconductor element according to claim 1, wherein:
the second type of processing data is intermediate process request data which is created based on a verification pattern and the biometric information pattern by the processor after the communication portion receives the verification pattern of the biometric information obtained from the external device;
the communication portion receives intermediate process result data as the processing result from the external device; and
the processor executes the biometric authentication process by using the intermediate process result data.

8. A semiconductor element according to claim 1, wherein:
the processor has a function of performing a registration process for registering the biometric information pattern in the memory;
the memory stores second data indicating whether an authentication process for authenticating execution of a registration process between the semiconductor element and the external device has succeeded or not; and
the processor does not decrease the residual number of trials when the second data indicates that the authentication process for authenticating execution of the registration process between the semiconductor element and the external device has succeeded.

9. A biometric authentication method for performing biometric authentication in a semiconductor element capable of communicating with an external device which obtains biometric information of a user, comprising the steps of:
storing a user's biometric information pattern used for execution of a biometric authentication process and a residual number of trials indicating a number of allowed failures in the biometric authentication process;
sending processing data used when the external device executes part of the biometric authentication process, to the external device;
storing first data indicating whether the residual number of trials has been decreased or not, while the processing data is fed to the external device after start of communication with the external device;
decreasing the residual number of trials by a predetermined value while a first type of processing data is output to the external device after start of communication with the external device;
receiving a result of processing executed by the external device based on the processing data;
performing the biometric authentication process by using the received processing result;
decreasing the residual number of trials by a predetermined value if the first data indicates that the residual number of trials has not been decreased when the processor has failed in the biometric authentication process, but changes the first data to indicate that the residual number of trials has not been decreased without decreasing the residual number of trials if the first data indicates that the residual number of trials has been decreased;
outputting a second type of processing data after performing the biometric authentication process, and
increasing the residual number of trials by a predetermined value or resetting the residual number of trials to an initial value when the biometric authentication process has succeeded,
wherein the step of performing the biometric authentication process is not executed when the residual number of trials is 0 after the decrease of the residual number, and
wherein the processing data does not include the biometric information pattern.

10. A biometric authentication system for performing a biometric authentication process through communication between a semiconductor element and an external device, wherein:
the semiconductor element includes a communication portion which communicates with the external device, a memory which stores a user's biometric information pattern used for executing the biometric authentication process and a residual number of trials indicating a number of allowed failures in the biometric authentication process, and a processor which performs the biometric authentication process;
the communication portion transmits processing data to the external device so that the external device can use the processing data when the external device executes part of the biometric authentication process;
the memory stores first data indicating whether the residual number of trials has been decreased or not, while the processing data is fed to the external device after start of communication with the external device;
the processor decreases the residual number of trials by a predetermined value while a first type of processing data is output to the external device after start of communication with the external device via the communication portion and does not execute the biometric authentication process if the residual number of trials is 0 after the decrease of the residual number;

the external device performs processing by using the processing data and sends a result of the processing to the semiconductor element;

the communication portion receives the processing result;

the processor performs the biometric authentication process by using the received processing result and increases the residual number of trials by a predetermined value or resetting the residual number of trials to an initial value when the biometric authentication has succeeded; and the processor decreases the residual number of trials by a predetermined value if the first data indicates that the residual number of trials has not been decreased when the processor has failed in the biometric authentication process, but changes the first data to indicate that the residual number of trials has not been decreased without decreasing the residual number of trials if the first data indicates that the residual number of trials has been decreased, the processor outputs a second type of processing data after performing the biometric authentication process, wherein the processing data does not include the biometric information pattern.

11. A mobile terminal for performing a biometric authentication process by communicating with an external device, comprising:

a communication portion which communicates with the external device;

a memory which stores a user's biometric information pattern used for execution of the biometric authentication process and a residual number of trials indicating a number of allowed failures in the biometric authentication process; and a processor which performs the biometric authentication process, wherein the communication portion transmits processing data to the external device so that the external device can use the processing data when the external device executes part of the biometric authentication process, wherein the memory stores first data indicating whether the residual number of trials has been decreased or not, while the processing data is fed to the external device after start of communication with the external device, wherein the processor;

decreases the residual number of trials by a predetermined value while a first type of processing data is output to the external device after the communication portion begins to start communication with the external device, receives a processing result executed by the external device, which uses the processing data, via the communication portion to determine whether or not the biometric authentication process has succeeded using the received processing result, performs the biometric authentication process based on the processing result and decreases the residual number of trials by a predetermined value if the first data indicates that the residual number of trials has not been decreased when the processor has failed in the biometric authentication process, but changes the first data to indicate that the residual number of trials has not been decreased without decreasing the residual number of trials if the first data indicates that the residual number of trials has been decreased, outputs a second type of processing data after performing the biometric authentication process, and when the residual number of trials is 0 after the decrease of the residual number, does not execute the biometric authentication process, and wherein the processing data does not include the biometric information pattern.

* * * * *